United States Patent
Eckert et al.

(12) 
(10) Patent No.: US 6,666,680 B2
(45) Date of Patent: Dec. 23, 2003

(54) MULTI-TRAIN INSTALLATION FOR THE PRODUCTION OF CEMENT CLINKER FROM RAW MEAL

(75) Inventors: Carsten Eckert, Cologne (DE); Stefan Köllen, Frechen (DE); Hubert Ramesohl, Bergisch Gladbach (DE); Matthias Mersmann, Lichtenbusch (BE)

(73) Assignee: KHD Humboldt Wedag, AG, Cologne (DE)

( * ) Notice: Subject to any disclaimer, the term of this patent is extended or adjusted under 35 U.S.C. 154(b) by 0 days.

(21) Appl. No.: 10/262,569

(22) Filed: Sep. 30, 2002

(65) Prior Publication Data

US 2003/0079371 A1 May 1, 2003

(30) Foreign Application Priority Data

Oct. 11, 2001 (DE) .......................... 101 50 097

(51) Int. Cl.⁷ ............................... F27B 15/12
(52) U.S. Cl. .................. 432/58; 432/16; 110/245; 106/739
(58) Field of Search .................. 432/14, 15, 16, 432/58, 106; 110/245; 106/703, 740, 739, 745

(56) References Cited

U.S. PATENT DOCUMENTS

| | | | | |
|---|---|---|---|---|
| 3,986,818 A | * | 10/1976 | Deussner et al. | 432/14 |
| 4,370,127 A | * | 1/1983 | Abelitis | 432/106 |
| 4,431,454 A | * | 2/1984 | Krennbauer | 106/762 |
| 4,504,319 A | * | 3/1985 | Wolter et al. | 106/767 |
| 4,530,661 A | * | 7/1985 | Herchenbach et al. | 432/106 |
| 6,264,738 B1 | * | 7/2001 | Lorke et al. | 106/739 |

OTHER PUBLICATIONS

Humbolt Wedag brochure Pyroclon 7–222d (cover page, 2 page illustration with figures 3 and 4 and English translation and figure 10), 1979. Page 419 from Duda Cement Data Book 2nd Ed., 1977.

* cited by examiner

Primary Examiner—Gregory Wilson
(74) Attorney, Agent, or Firm—Charles L. Schwab; Nexsen Pruet Jacobs & Pollard, LLC

(57) ABSTRACT

A dual-train or multi-train installation for the production of cement clinker from raw meal includes several cyclone suspension heat exchanger trains which provide substantially equal gas and meal loads of the following gas-solid suspensions through use of a vortex homogenization chamber (29), having an inlet opening (30) for the gas-solid suspension and having at least two outlets to a pair of pipes (28, 31) for the discharge of the thoroughly blended homogenized gas-solid suspension substreams. The vortex homogenization chamber (29) is positioned in a calcination stage (17), upstream of its branching and splitting between the several heat exchanger trains (A, B).

8 Claims, 3 Drawing Sheets

MULTI-TRAIN INSTALLATION FOR THE PRODUCTION OF CEMENT CLINKER FROM RAW MEAL

TECHNICAL FIELD

This invention relates to an installation for the production of cement clinker from raw meal, which is preheated in at least two mutually parallel cyclone suspension heat exchanger trains and precalcined in a fueled calcination stage, from which the gas-solid suspension is fed by suspension splitting into the lowermost cyclone stage of each cyclone suspension heat exchanger train for the purpose of separating the precalcined raw meal from the off-gas stream, the precalcined raw meal substreams of all heat exchanger trains subsequently being fed into a rotary kiln for cement clinker burning.

BACKGROUND OF THE INVENTION

Given that required production capacities are large, installations for the production of cement clinker from raw meal are often made as dual-train installations or twin systems having two separate, mutually parallel, fueled rotary kiln off-gas risers made as raw meal calciners and having two mutually parallel cyclone suspension heat exchanger trains through which the calciner off-gases flow, one raw meal substream being thermally treated in each of the two trains. Such an installation is disclosed in a KHD Humboldt Wedag AG brochure "PYROCLON" 7-222 d, 1979, pages 4 and 5, FIG. 3. It can happen that the gas and meal burdens of the gas-solid suspension differ from one calcination train to the other and from one heat exchanger train to the other, not least of all because of the sense of rotation of the rotary kiln to whose charging chamber the two trains are connected.

Also known are so-called hybrid installations in which the two above-described separate calciner trains are combined into a single calciner in shaft form, supplied with calcination fuel, through which rotary kiln off-gas flows, at the upper end of which calciner the upwardly flowing gas-solid suspension is split into two substreams, which are then led to the two heat exchanger trains via two pipe bends inclined away from each other. Such an installation is disclosed in Duda *Cement Data Book,* 2nd Edition, 1977, p. 419. Here again, it can happen that when the gas-solid suspension from the calciner is branched, the meal and gas contents in the several heat exchanger trains may differ, so that also the loadings of the several heat exchanger trains differ sharply, which has a detrimental effect on the specific heat requirement for the installation as a whole.

This problem is further aggravated if fuel fed at least one $DeNO_x$ unit in the rotary kiln off-gas riser, that is, in the calciner, is combusted under richer than stoichiometric conditions, that is, with an oxygen deficiency, in order to create a CO-containing reduction zone or CO gas strand for the reduction of the pollutant $NO_x$ formed, in particular, by high-temperature combustion in the rotary kiln (thermal $NO_x$). The CO gas strand is then not uniformly distributed over the calciner cross section. Especially when the CO not consumed in the $NO_x$ reduction zone of the rotary kiln off-gas duct and the solid fuel particles initially not combusted in the calciner cannot be completely burned out, it can happen that unequal and also transient strand-wise fuel loadings may come about in the two heat exchanger trains.

OBJECTS AND SUMMARY OF THE INVENTION

It is therefore an object of the invention to create, for the production of cement clinker from raw meal, a two-train or multi-train installation such that it is guaranteed that the several cyclone suspension heat exchanger trains are no longer loaded with unequal gas and meal loads of the flowing gas-solid suspension.

The cement clinker production installation according to the invention, having heat exchanger lines made in dual-train or multi-train form and charged with a calcination off-gas suspension from a common calciner, is characterized in that a vortex chamber/mixing chamber/homogenization chamber, having an inlet opening for the gas-solid suspension and having at least two outlets for the exit of the thoroughly blended gas-solid suspension substreams, is arranged in the calcination stage, at latest at its end upstream of its branching and splitting between the several heat exchanger trains. In this homogenization chamber, the gas-solid suspension of the calciner is effectively thoroughly blended with a gas in a homogeneously loaded manner, for example, by CO strands before the thoroughly blended homogenized gas-solid suspension is subsequently split between the several heat exchanger trains, so that the specific heat requirement of the multi-train installation is minimized and its operational reliability is enhanced. This holds true especially for multi-train installations having $DeNO_x$ units in the calciner for $DeNO_x$ reduction in the off-gas, because the homogenization chamber also provides for intensive mixing of residual fuel constituents still present in the calciner as well as residual CO gas strands, etc., with atmospheric oxygen and thus provides for residual burnout and thus also a high degree of raw meal calcination (e.g., 95%).

The vortex chamber/mixing chamber/homogenization chamber with subsequent branching of the homogenized gas-solid suspension is made in such a fashion that it equalizes in homogeneities of the inflowing gas-solid suspension by intensive mixing. For this purpose, the inlet opening of the vortex chamber can be arranged such that a rotational component is superposed on the entering gas-solid suspension. It is, however, also possible that for this purpose a fixed or rotating swirl generator is built into the vortex chamber, for example on the cover of a vortex and separation can occur when the gas-solid suspension impinges centrally from beneath, the flow being deflected to the periphery, reversed downward and led to at least two bottom outlets for the homogenized gas-solid suspension for the purpose of splitting between the separate cyclone suspension heat exchanger trains.

For effective homogenization of the gas-solid suspension, the vortex chamber arranged in the calcination stage can have in its upper region an opening for the tangential inlet of the gas-solid suspension and at its bottom two or a plurality of outlets for the discharge of the mixed homogenized gas-solid suspension, these outlets each being connected via a pipeline to the lowermost cyclone stage of one of the cyclone suspension heat exchanger trains.

BRIEF DESCRIPTION OF THE DRAWINGS

The invention and its further features and advantages will be explained in more detail on the basis of exemplary embodiments illustrated schematically in the accompanying drawings in which.

DETAILED DESCRIPTION OF THE INVENTION

Figure 1:
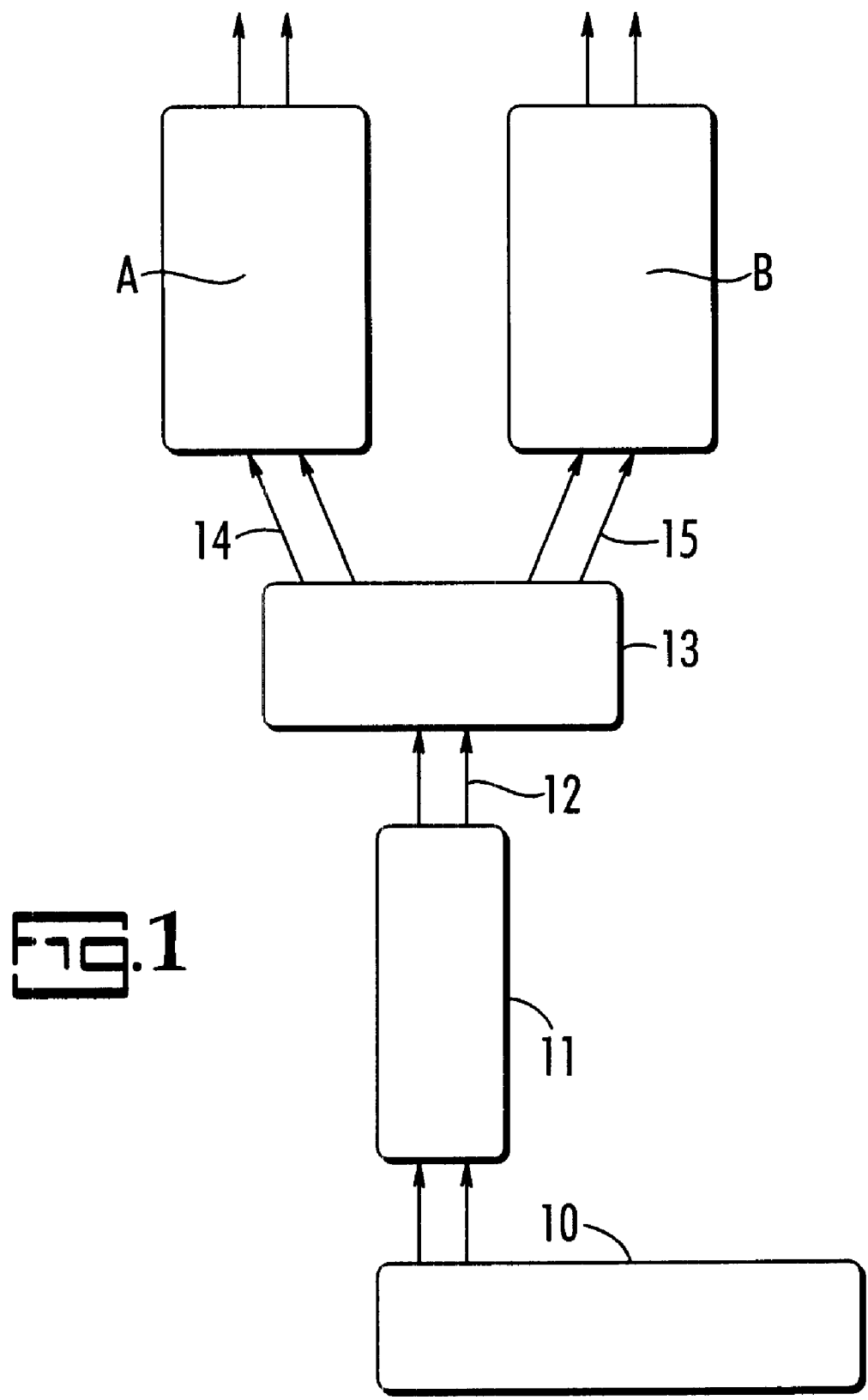
FIG. 1 shows schematically, as a block flow sheet, an installation for the production of cement clinker, having, as viewed upwardly from below, a rotary kiln, a calciner, and a vortex chamber/mixing chamber/homogenization chamber with subsequent branching of the gas-solid suspension to two mutually parallel heat exchanger trains.

The cement clinker production installation according to FIG. 1 has a rotary kiln 10 and a calcination stage 11, through which rotary kiln off-gas flows, which calcination stage as a rule is supplied with calcination fuel and clinker cooler exhaust air (tertiary air), the gas stream 12 of which calcination stage is in homogeneously laden with solids, namely precalcined raw meal and solid fuel that has remained uncombusted, and also in homogeneously laden with off-gas components such as for example CO. For this reason, according to the invention, the gas-solid suspension of the calciner 11 is first led into a vortex chamber/mixing chamber/homogenization chamber 13 and there homogenized before two approximately equal suspension substreams 14 and 15 are then subsequently split between left-hand heat exchanger train A on the one hand and right-hand heat exchanger train B on the other hand, as can be seen in detail in FIG. 2.

Figure 2:
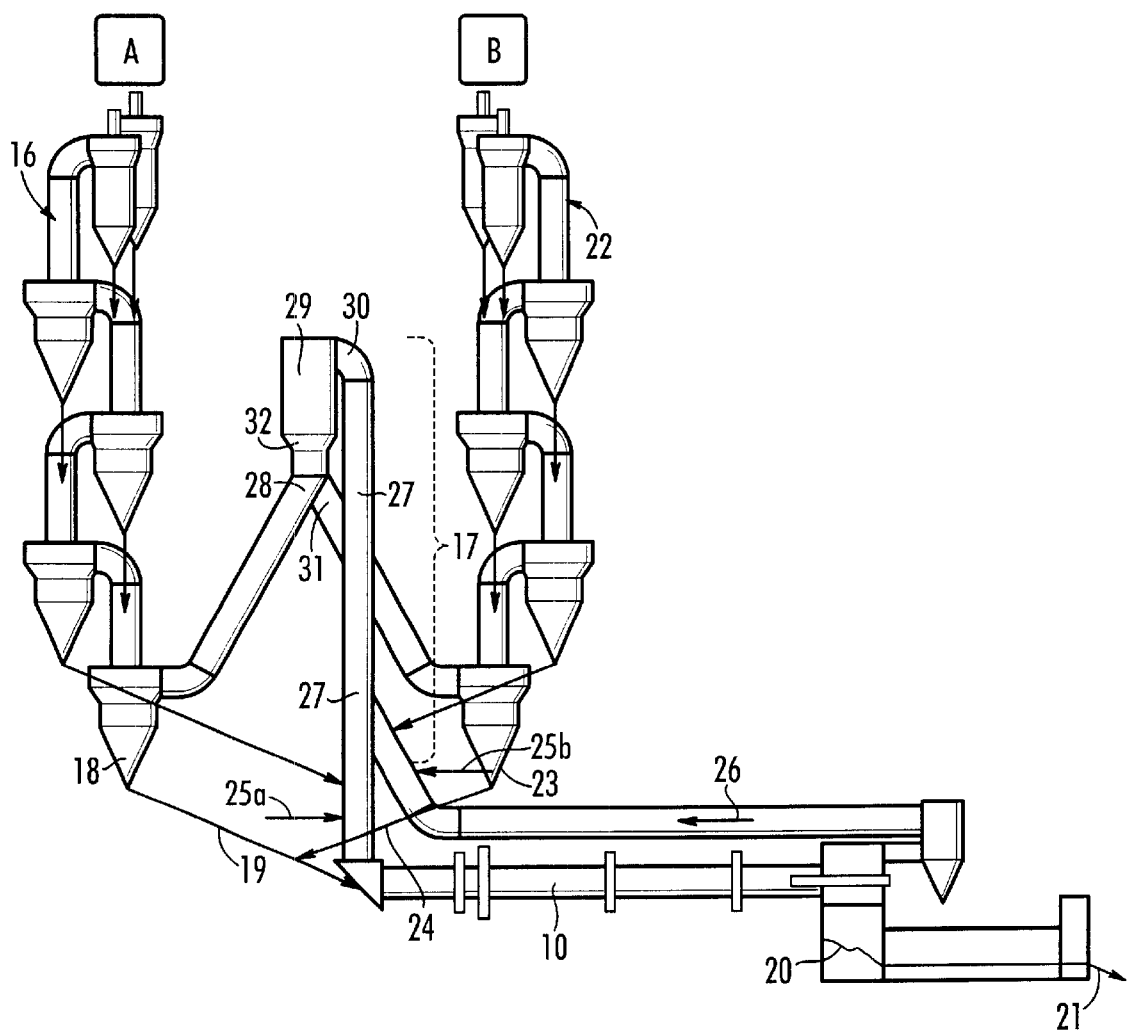
FIG. 2 is a schematic showing of an installation for cement clinker production with dual-train preheater.

According to FIG. 2, cement raw meal 16 is fed from above into left-hand cyclone suspension heat exchanger train A, where it migrates through the cyclone stages in succession, in a combined co current/countercurrent flow to the hot off-gas of a calcination stage 17, in order to be separated from the hot off-gas stream in lowermost cyclone 18 and fed into the charging chamber of the rotary kiln 10 as highly (e.g., 95%) calcined cement raw meal 19, to be burned to a cement clinker in the sintering zone of the rotary kiln and subsequently cooled in a clinker cooler 20, for example a grate cooler. The cooled cement clinker exits the clinker cooler 20 at 21.

A further raw meal substream 22 is fed from above into right-hand cyclone suspension heat exchanger train B, where it likewise migrates successively through the cyclone suspension heat exchanger stages in a combined co current/countercurrent flow to the hot off-gas of calcination stage 17 in order to be separated from the hot off-gas stream in a lowermost cyclone 23 and likewise fed into the charging chamber of rotary kiln 10 as highly calcined cement raw meal 24.

In the calcination stage 17, which is supplied with fuel 25a, 25b and with tertiary air from a tertiary air line 26 from the clinker cooler 20, the preheated cement raw meal exiting the next-to-lowest cyclone stages of the two heat exchanger trains is precalcined to a high degree. Fuel 25a is advantageously combusted under richer than stoichiometric conditions at at least one of the so-called $DeNO_x$ units in the kiln off-gas riser coming from the rotary kiln 10, in order to create a CO-containing reduction zone for the reduction of the pollutant $NO_x$ contained in the rotary kiln off-gas, while the fuel 25b can advantageously be combusted under leaner than stoichiometric conditions in the tertiary air 26 coming from the clinker cooler. The residual burnout of the CO initially remaining in excess in the $DeNO_x$ reduction zone and the burnout of hydrocarbons, if any, that have remained uncombusted can be effected with oxygen from excess tertiary air 26.

In the fueled calcination stage 17, the gas-solid suspension from an ascending branch pipe 27 is diverted by roughly 180° into a descending branch pipe 28. Despite this flow diversion, in homogeneous loading states of the gas can come about in the tubular calciner, for example a nonuniform distribution of residual incompletely burned-out CO gas strands over the cross section. For this reason, the invention consists in arranging, in calcination stage 17, at latest at its end upstream of its branching and splitting between the several heat exchanger trains A and B, a vortex chamber/mixing chamber/homogenization chamber 29, for example at the highest point or in the region of the flow diversion of gooseneck-shaped calcination stage 17. The gas-solid suspension is intensively mixed or homogenized or thoroughly blended in homogenization chamber 29 before the gas-solid suspension is then split between the two heat exchanger trains A and B.

According to the exemplary embodiment of FIG. 2, the vortex chamber/mixing chamber/homogenization chamber 29 can have in its upper region an opening 30 for the tangential inlet of the gas-solid suspension and outlets at its bottom to two branch pipes 28 and 31 through which the two heat exchanger trains A and B are charged with gas-solid suspension, the two heat exchanger trains no longer being characterized by unequal loading states.

From FIG. 2 it follows that the free cylindrical cross section of homogenization chamber 29 can be constricted, with a conical part 32 arranged at its bottom, to the cross section of the outlets to branch pipes 28, 31.

Figure 3:
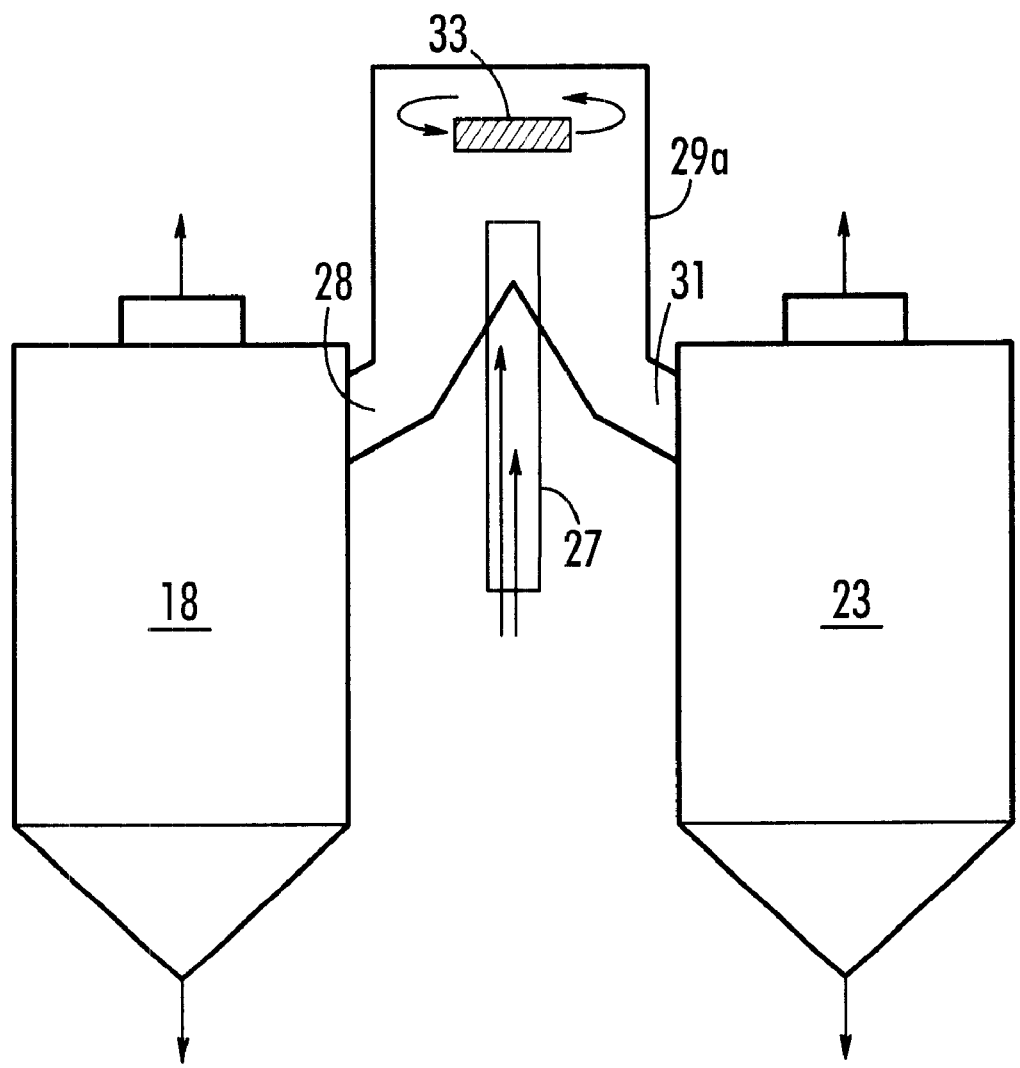
FIG. 3 shows, as a variant of FIG. 2, a different embodiment of the vortex chamber/mixing chamber/homogenization chamber.

FIG. 3, as a variant of FIG. 2, shows a different embodiment of vortex chamber/mixing chamber/homogenization chamber 29a into which a swirl generator 33 is built in stationary fashion. The gas-solid suspension of the ascending branch pipe 27 of the calcination stage 17 impinges on the swirl generator centrally from beneath, the flow being deflected to the periphery, reversed downward and led to the bottom outlet pipes 28, 31 for the purpose of splitting the homogenized gas-solid suspension between heat exchanger trains A and B.

What is claimed is:

1. An installation including a rotary kiln for the production of cement clinker from raw meal, which is preheated in at least two mutually parallel cyclone suspension heat exchanger trains and precalcined in a fueled calcination stage, from which a gas-solid suspension line is fed by suspension splitting into the lowermost cyclone stage of each cyclone suspension heat exchanger train for the purpose of separating the precalcined raw meal from a rotary kiln off-gas line, the precalcined raw meal substreams of the heat exchanger trains subsequently being fed directly into the rotary kiln for cement clinker burning, comprising:
   a vortex homogenization chamber having
      an inlet opening connected in receiving relation to said gas-solid suspension line of said calcination stage and
      a pair of outlets for discharging thoroughly blended gas-solid suspension substreams,
   a first discharge pipe interconnecting one of said outlets with one of said lowermost cyclone stages and
   a second discharge pipe interconnecting the other of said outlets with the other of said lowermost cyclone stages, whereby thoroughly blended gas-solid suspension substreams from said calcination stage are delivered to said lowermost cyclone stages of said heat exchanger trains.

2. The installation as set forth in claim 1 wherein said inlet opening is near the top of said vortex homogenization chamber and provides a tangential inflow of said gas-solid suspension and wherein said outlets to said discharge pipes are at the bottom said vortex homogenization chamber.

3. The installation as set forth in claim 1 wherein said vortex homogenization chamber includes a conical part providing flow restriction to said outlets to said said discharge pipes.

4. The installation as set forth in claim 1 wherein said vortex homogenization chamber includes a swirl generator for said inflowing gas-solid suspension.

5. The installation as set forth in claim 4 wherein said swirl generator is built into said vortex chamber in stationary fashion and said gas-solid suspension of said ascending branch pipe of said calcination stage impinges on it centrally from beneath, the flow being deflected to the periphery, reversed downward and led to said outlets to said discharge pipes thereby splitting the homogenized gas-solid suspension between said heat exchanger trains.

6. The installation as set forth in claim 5 having a tertiary air line between the clinker cooler and said gas-solid suspension line and a $DeNO_x$ unit opening into said gas-solid suspension line of said calcination stage downstream of the connection of said tertiary air line to said gas-solid suspension line thereby creating a CO-containing reduction zone for $NO_x$ reduction in off-gas from said rotary kiln.

7. The installation as set forth in claim 6 wherein said homogenization chamber is equipped with a device for the injection of reactants to lower the $NO_x$ content present in the off-gases from said rotary kiln and clinker cooler.

8. An installation for the production of cement clinker from raw meal comprising:

a rotary kiln, at least two mutually parallel cyclone suspension heat exchanger trains in which said raw meal is preheated, each of said heat exchanger trains having a lowermost cyclone stage, a fueled calcination stage including a gas-solid suspension line receiving off-gas directly from said rotary kiln and preheated raw meal from said heat exchanger trains and a vortex homogenization chamber having
    an inlet opening connected in receiving relation to said gas-solid suspension line,
    a pair of outlets for discharging thoroughly blended gas-solid suspension substreams,
    a first discharge pipe connecting one of said chamber outlets in gas-solid delivery relation to one of said lowermost cyclone stages and
    a second discharge pipe connecting the other of said chamber outlets in gas-solid delivery relation to the other of said lowermost cyclone stages.

* * * * *